United States Patent [19]

Ide et al.

[11] Patent Number: 5,156,693

[45] Date of Patent: Oct. 20, 1992

[54] INFORMATION RECORDING MEDIUM

[75] Inventors: Yukio Ide, Mishima; Makoto Harigaya, Hiratsuka; Yoshiyuki Kageyma, Yokohama; Hiroko Iwasaki, Tokyo, all of Japan

[73] Assignee: Ricoh Company, Ltd., Tokyo, Japan

[21] Appl. No.: 657,517

[22] Filed: Feb. 19, 1991

[30] Foreign Application Priority Data

| Feb. 19, 1990 | [JP] | Japan | 2-36176 |
| Feb. 20, 1990 | [JP] | Japan | 2-37466 |
| Feb. 23, 1990 | [JP] | Japan | 2-41051 |
| May 24, 1990 | [JP] | Japan | 2-132708 |
| Jun. 29, 1990 | [JP] | Japan | 2-171325 |
| Nov. 27, 1990 | [JP] | Japan | 2-320811 |
| Dec. 28, 1990 | [JP] | Japan | 2-415581 |

[51] Int. Cl.$^5$ .............................................. C22C 45/00
[52] U.S. Cl. .................................... 148/403; 428/642; 420/576; 346/135.1
[58] Field of Search ............... 148/403; 420/576; 428/642; 346/135.1; 430/617

[56] References Cited

U.S. PATENT DOCUMENTS

| 4,889,746 | 12/1989 | Utsumi et al. | 427/162 |
| 4,947,372 | 8/1990 | Koshino et al. | 365/106 |
| 5,011,723 | 4/1991 | Harigaya et al. | 346/135.1 |
| 5,015,548 | 5/1991 | Pan et al. | 346/135.1 |

Primary Examiner—Michael Lewis
Assistant Examiner—Ngoc-Yen M. Nguyen
Attorney, Agent, or Firm—Cooper & Dunham

[57] ABSTRACT

An information recording medium is disclosed which records information through the transition of two phases of a recording material, utilizing electromagnetic wave energy. The information recording medium comprises a recording layer made up of a recording material of a composition represented by the formula:

wherein
$6 \leq \alpha \leq 13$
$8 \leq \beta \leq 17$
$18 \leq \gamma \leq 28$
$45 \leq \delta \leq 66$
$\alpha + \beta + \gamma + \delta = 100$.

3 Claims, 5 Drawing Sheets

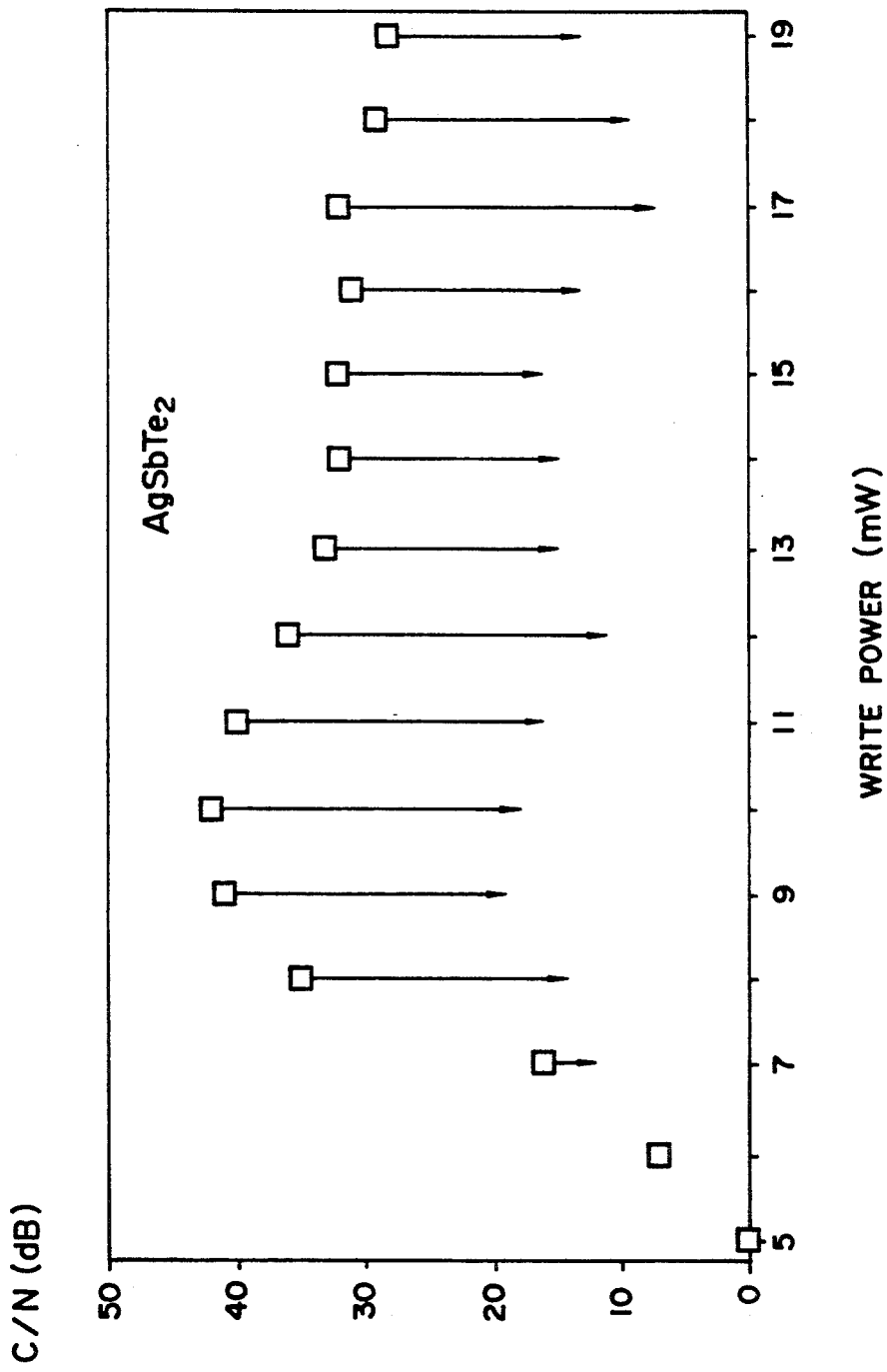

INFORMATION RECORDING MEDIUM

BACKGROUND OF THE INVENTION

1. Field of the Invention

The present invention relates to an information recording medium, and more particularly to a phase-change type of information recording medium wherein a phase change, resulting from the application of a laser beam, is produced in a material which forms a recording layer to provide an information recording medium on which recording or writing (hereinafter referred to as writing or write), reproduction, and overwriting of information is possible, and which is suitable for application in optical memory related equipment.

2. Discussion of Background

One commonly known type of optical memory medium whereon writing, reproduction and erasing of data is possible by the application of electromagnetic waves, in particular, a laser beam, is the phase-change type of recording medium which utilizes the transition from a crystalline phase to a non-crystal or amorphous phase or from one crystalline phase to another crystalline phase. In particular, with respect to this type of recording medium, research and development has recently become very active because overwriting using a single beam, which is difficult in the case of a magneto-optical memory, is possible., and the optical system on the drive side for this recording medium is simpler in mechanism than that of the optical system for a magneto-optical memory.

As representative examples of a material for the phase-change type recording medium, chalcogen type alloy materials such as Ge-Te, Ge-Te-S, Ge-Se-S, Ge-Se-Sb, Ge-As-Se, In-Te, Se-Te, Se-As and the like, as disclosed in U.S. Pat. No. 3,530,441, can be given. Furthermore, it has been proposed to add to the Ge-Te alloys materials such as Au as disclosed in Japanese Laid-Open Patent 61-21962, Sn and Au in Japanese Laid-Open Patent 61-270190, and Pd in Japanese Laid-Open Patent No.62-19490 with the object of improving the stability and speed of crystallization. A material with a specified composition ratio for Ge-Te-Se as disclosed in Japanese Laid-Open Patent 62-73438 has also been suggested for improving the write/erase repeatability characteristics. However, none of these methods completely satisfy the many characteristics required in a phase-change type optical memory medium in which overwriting is possible. In particular, the most important problems to be solved are the improvement of write and erase sensitivity, prevention of lowering of erase ratio resulting from failure of erase prior to overwriting, and improvement of the life of both the recorded and unrecorded portions in the recording layer.

In the phase-change type of recording method, the transition from a crystalline phase to an amorphous phase or from one crystalline phase to another crystalline phase is utilized, and the energy from the incident electromagnetic waves is converted into heat energy in the recording layer portion so that a phase transition occurs between the recorded section and the non-recorded section of the recording material. In order to reduce the time required for writing and erasure as far as possible, an amorphous phase, which is a metastable phase, is generally used, for example, in the recorded portion, and a crystalline phase, which is a stable phase, is generally used in the unrecorded portion. To form the amorphous phase which is a metastable phase, the temperature of the material must be raised above the melting point (Tm) to break the bonds between the molecules. Furthermore, rapid cooling is necessary to freeze the disordered or irregular state in the amorphous phase. To form the crystalline phase which is a stable phase, the temperature of the material must be raised above the crystallization transition point (Tc) to stimulate the bonds between the molecules. Also, slow cooling conditions are necessary to form the crystalline phase. From this type of theoretical reasoning, in a phase-change type of recording material a breakdown in the characteristics of the medium and a shortening of the life span are unavoidable from the thermal history.

The characteristics such as writing and erasure sensitivities and life span are strongly influenced by the magnitude of the barriers to energy transition between the amorphous and crystalline phases, specifically, the melting point (Tm) and the crystallization transition point (Tc). When these energy barriers are small, the writing and erasure sensitivities are good, but the life of the writing portion is short. Conversely, when these energy barriers are large, the writing and erasure sensitivities deteriorate but the life span is long. Accordingly, there are many cases in which a material is used in which the melting point is usually about 600° C. and the crystallization transition point about 200° C. so that these conditions are optimized. In order to provide an improvement in sensitivity, there are also cases in which a material with a large heat absorption ratio is added to the recording layer, or in which a heat absorbing layer or the like is provided in the recording medium. However, elevating the temperature of the recording material close to the melting point causes a degradation of the writing and erasure characteristics from the thermal history. Furthermore, when consideration is given to the oscillation output of a semiconductor laser, if a recording medium which needs high write power is employed, the cost of the recording apparatus for such a recording medium will also be high.

High speed and high writing density are also expected in an optical recording medium, and writing and erasure under these conditions require even higher power which causes lowering of the writing and erasure sensitivities, C/N ratio, and erase ratio.

In Japanese Laid-Open Patent 63-251290, an optical recording medium is disclosed in which a recording layer, when in a crystalline state, is of a single phase comprising a multi-component (tertiary or more) compound. Here, in practice, a compound with a tertiary or greater stoichiometric composition, for example, $In_3Sb-Te_2$, is used as the multi-component compound with a 90 atomic % or greater in the recording layer. By using this type of recording layer, high speed writing and erasure are possible. However, the laser power required for writing and erasure has not yet been sufficiently reduced. There are other drawbacks inasmuch as the erase ratio is also low, and the repeatability and long term reliability are not satisfactory. The development of a suitable recording material for providing stable, highly sensitive writing and erasure is still awaited.

SUMMARY OF THE INVENTION

Accordingly, an object of the present invention is to provide, with due consideration to the drawbacks of such conventional information recording media, an information recording medium with a long life expectancy, an improved C/N ratio, erase ratio, and writing and erasure sensitivity, on which repeated writings and erasures are possible.

This object is achieved in the present invention by an information recording medium for writing information through the transition of two phases of a recording material, utilizing electromagnetic wave energy and comprising a recording layer which in turn comprises a recording material of a composition represented by the formula:

$Ag_\alpha In_\beta Te_\gamma Sb_\delta$ wherein
$6 \leq \alpha \leq 13$
$8 \leq \beta 17$
$18 \leq \gamma 28$
$45 \leq \delta \leq 66$
$\alpha + \beta + \gamma + \delta = 100$ Furthermore, in the recording material in the still unrecorded state, the crystalline phase and the amorphous phase are included in the recording layer, and the crystalline phase makes up 50 mol % or less of the total recording layer. As a result of using this type of recording material, the C/N ratio and the erase ratio increase, and writing and erasure can be performed at low power. Accordingly, stress caused by the thermal history of the recording layer in the recording material is held to the minimum, and repeatability characteristics and life expectancy are greatly improved.

BRIEF DESCRIPTION OF THE DRAWINGS

In the drawings,

FIG. 5 is a graph showing the relationship for the C/N ratio during simple write/erase mode and the erase ratio after erasure by a DC beam, versus the write power Pw (mW), for a conventional information recording medium.

DETAILED DESCRIPTION OF THE PREFERRED EMBODIMENTS

Measurements were made by X-ray diffraction and electron beam diffraction, and observations made by a transmitting type electron microscope (TEM) to clarify the fabrication process and the write and erase mechanisms of the recording layer of the information recording medium of the present invention. The following results were obtained.

A halo pattern was observed from both X-ray diffraction and electron beam diffraction in the as-deposited state which showed the material to be amorphous. In addition, TEM observations revealed an extremely uniform amorphous phase.

Figure 1:
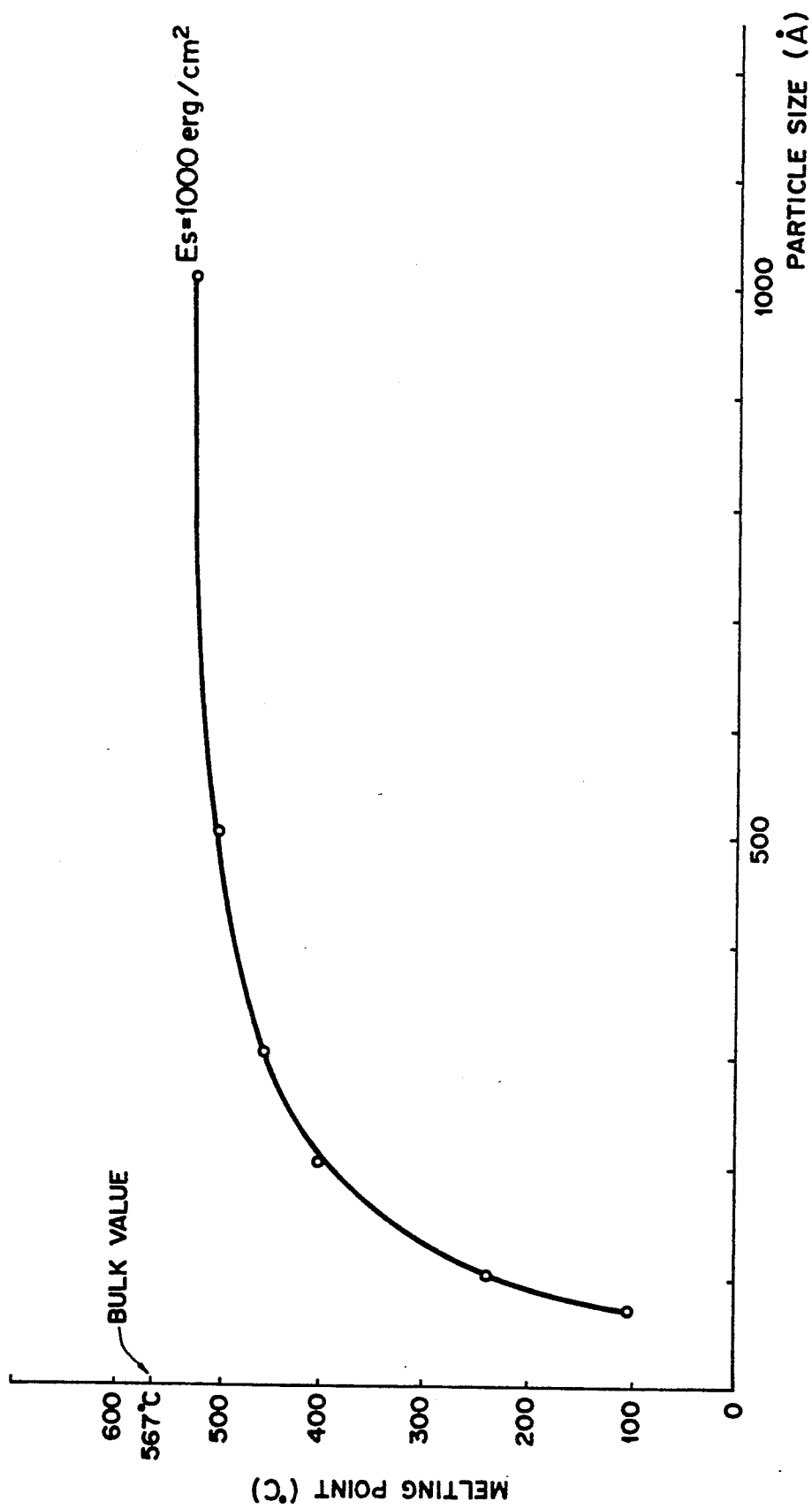
FIG. 1 is a graph showing the relationship between the melting point (° C.) and the particle size (Å).

After crystallization by laser annealing, a halo pattern showing the existence of an amorphous material and a crystallization peak from $AgSbTe_2$ were observed specifically under X-ray diffraction of the unrecorded portion. A ring and halo pattern showing the existence of an amorphous material and a spot diffraction image from $AgSbTe_2$ crystals were observed in the electronic beam diffraction. From this it is considered that both $AgSbTe_2$ crystals and a material in, or close to, an amorphous state are present in the unrecorded portion of the information recording medium. Specifically, it appears that phase separation or phase splitting occurs in the crystallization process, and $AgSbTe_2$ is dispersed as very fine crystals. As demonstrated by Toshio Hirai in Electronic Ceramics No.5, 1986, a dispersed phase formed through this type of process has particles of small diameter, ranging from several nm to several tens of nm. When the particle diameter is of this order, the melting point takes a large drop as a result of the size effect, as shown in FIG. 1. When the particle diameter of $AgSbTe_2$ is 300 Å, the melting point is estimated to drop to about 460° C. from about 570° C. which is the melting point in a bulk state, with the assumption that the surface energy thereof being 1000 erg/cm².

An additional feature is that the interface is the grain boundary of the crystal. This is the main reason that small crystals are always held very small. The average particle diameter of the $AgSbTe_2$ crystals obtained from the actual X-ray diffraction line width using the Scherrer's formula indicates that the $AgSbTe_2$ is in the form of small crystals of about 120 Å. In addition, the magnitude of the grains is seen to be distributed in the range from about 50 Å to 300 Å when observed by TEM. The values obtained by X-ray diffraction are considered to be statistical averages.

Figure 2:
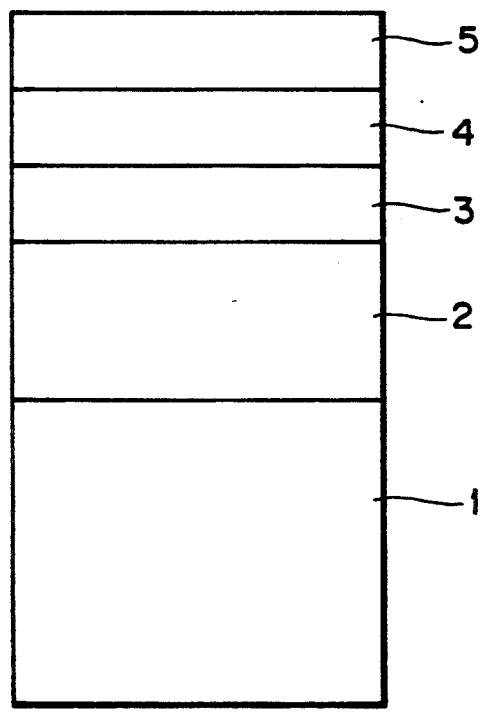
FIG. 2 is a schematic cross-sectional view of the structure of an information recording medium of the present invention.

The present invention will now be explained with reference to the accompanying drawings. In FIG. 2, the structure of an example of an information recording medium of the present invention is shown. In this example, a first heat resistant protective layer 2, a recording layer 3, a second heat resistant protective layer 4, and a reflecting layer 5 which reflects light and/or discharge heat therefrom (hereinafter referred to as the reflecting layer) are provided in that order on a substrate 1. As required, an environment protection layer (not shown) may be provided on the reflecting layer 5. Heat resistant protective layers are not necessarily required on both sides of the recording layer 3. A configuration with the first heat resistant protective layer 2 only or the second heat resistant protective layer 4 only is also acceptable. In the case where the substrate is made from a material with low heat resistance, such as polycarbonate resin, it is preferable that the first heat resistant protective layer 2 be provided.

The substrate used with the present invention is usually made of glass, ceramics, or resin. Resin is ideal as a substrate material from the aspect of ease of fabrication, cost, and the like. Representative examples of the resin include polycarbonate resin, acrylic resin, epoxy resin, polystyrene resin, acrylonitrile-styrene copolymer resin, polyethylene resin, polypropylene resin, silicone resin, fluorine-containing resin, ABS resin, urethane resin, and the like. However from the aspect of processability, optical characteristics, and the like, polycarbonate resin and acrylic resin are preferable. The substrate may be in the shape of a disk, a card, or a sheet The material for the heat resistant protective layers may be a metallic oxide compound such as SiO, $SiO_2$, ZnO, $SnO_2$, $Al_2O_3$, $TiO_2$, $In_2O_3$, MgO, $ZrO_2$, and the like; a nitride such as $Si_3N_4$, AlN, TiN, BN, ZrN, and the like; a sulfide such as ZnS, $In_2S_3$, $TaS_4$, and the like; a carbide such as SiC, TaC, $B_4C$, WC, TiC, ZrC, and the like, or a diamond-type carbon, or a mixture of these. These materials can be used independently as a protective layer or can be mixed together. Impurities may also be added as required. The melting point of the heat resistant protective layer must be higher than the melting point of the recording layer. This type of protective layer can be formed by various types of vapor deposition methods such as, for example, the vacuum deposition method, the sputtering method, the plasma CVD method, the optical CVD method, the ion plating method, the electron beam deposition method, and the like. It is preferable that the thickness of the heat resistant protective layer be in the 200 Å to 5000 Å range, and more preferably in the 500 Å to 3000 Å range. If less than 200 Å, the effectiveness as a heat resistant protective layer tends to be lost; if greater than 5000 Å, the sensitivity tends to decrease and there is a tendency for peeling to occur at the interface. The protective layer may also be built up in laminations as required.

The recording layer used in the present invention can be formed by various types of vapor deposition methods such as, for example, the vacuum evaporation method, the sputtering method, the plasma CVD method, the optical CVD method, the ion plating method, the electron beam deposition method, and the like. Methods other than vapor deposition methods which can be used include wet process methods such as the sol-gel method.

It is preferable that the thickness of the recording layer be in the 100 Å to 10,000 Å range, and more preferably in the 200 Å to 3000 Å range.

Metallic materials such as Al, Au, and the like can be used for the reflecting layer, but are not absolutely necessary. This type of reflecting layer can be formed by various types of vapor deposition methods such as the vacuum evaporation method, the sputtering method, the plasma CVD method, the optical CVD method, the ion plating method, the electron beam evaporation method, and the like.

Laser beams, electronic beams, X-rays, ultraviolet rays, visible light, infrared rays, microwaves, and the like can be adopted as the electromagnetic waves used in writing, overwriting, and erasure, and a small, compact, semiconductor laser is most effective for installation as the drive.

The present invention will now be explained with reference to specific examples which are given for illustration of the invention and are not intended to be limiting thereof.

EXAMPLE 1

A disk No. 1 according to the present invention was fabricated for evaluation as an optical disk by laminating a first heat resistant protective layer of $Si_3N_4$ with a thickness of 2000 Å, a recording layer of $Ag_{11}In_{11}Te_{23}Sb_{55}$ with a thickness of 1000 Å, a second heat resistant protective layer of $Si_3N_4$ with a thickness of 1000 Å and a reflecting layer of Al with a thickness of 500 Å, in that order, on a polycarbonate substrate with a 1.6 μm pitch, a 700 Å groove depth, a 1.2 mm thickness, and an 87 mm diameter, using the rf sputtering method.

Optical disk evaluation was carried out using an 830 nm semiconductor laser beam by applying a 1 μm diameter spot through a lens with a numerical number (NA) of 0.5 onto the surface of the medium from the substrate side.

The recording layer immediately after fabrication was in an amorphous state, but for the evaluation measurement, a DC light beam (non-modulated light beam) was applied to the entire surface of the recording medium in such a manner that the light energy on the surface of the medium was 10 mW, so that the entire surface of the disk was crystallized in an adequate fashion to provide the initial, unrecorded state.

The line speed of the disk was 7 m/sec. The recording write-in was performed at a line speed of 7 m/sec, and a frequency of 4 MHz; overwriting was carried out with signals of 4 and 5 MHz. The read-out beam power Pr was 1 mW.

Figure 3:
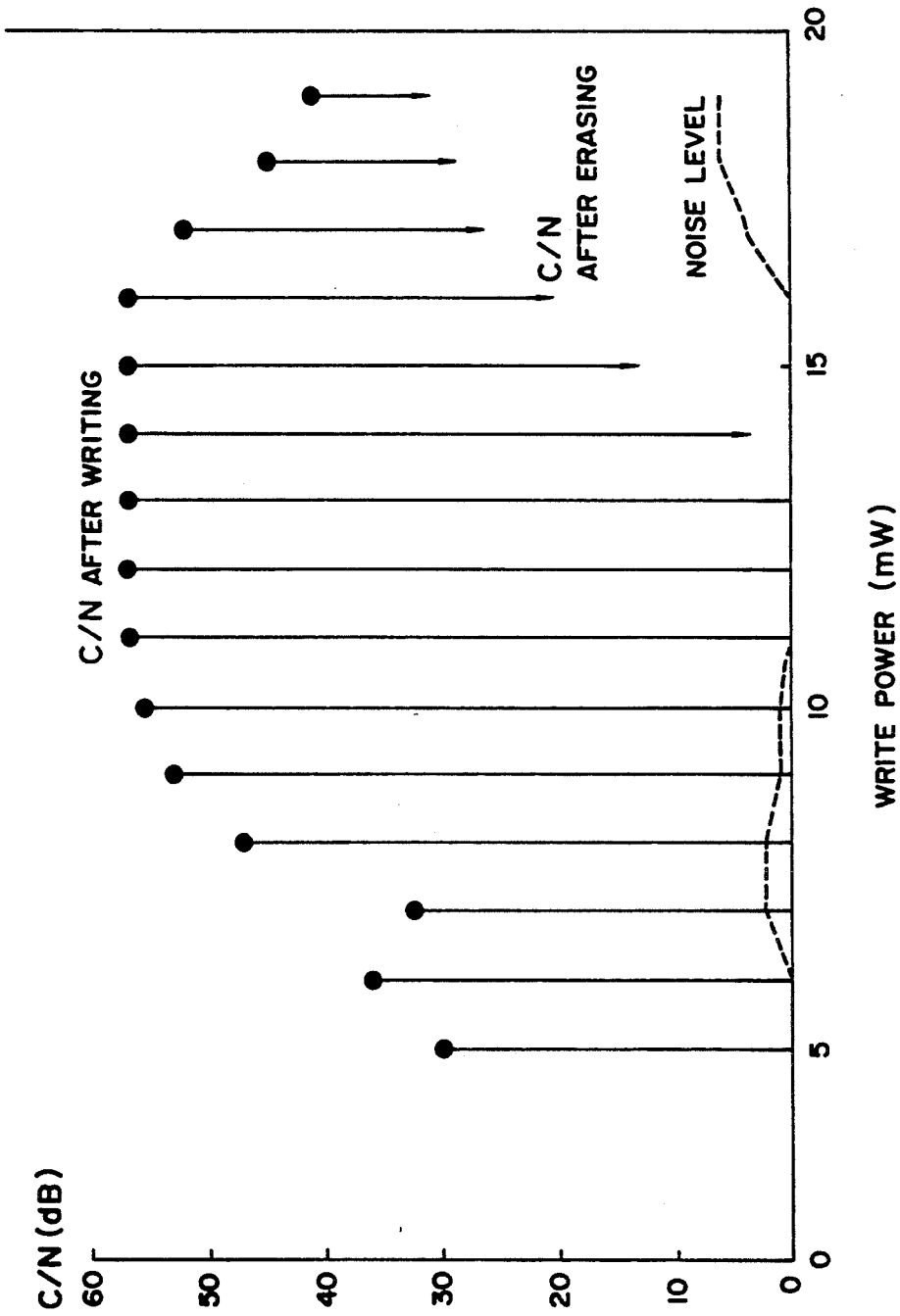
FIG. 3 is a graph showing the relationship of the C/N ratio during simple write/erase mode and the erase ratio after erasure by a DC beam, versus the write power Pw (mW), for the information recording medium of the present invention.

FIG. 3 is a graph showing the relationship of the C/N ratio during simple write/erase mode and the erase ratio after erasure by a DC light beam, versus the write laser power Pw. The erasing laser power Pe and the initialization power were both 10 mW. The black dots on the graph indicate the C/N values during writing; the lengths of the arrows represent the C/N values after erasure by a DC light beam. Accordingly, the C/N values at the tips of the arrows are the unerased C/N values. This shows that extremely high C/N values are obtained with the disk of the present invention.

In addition, simple erasure is provided by which the C/N value of the recorded mark can be 100% erased. Further, writing or recording is possible with a Pw of 5 mW, and the C/N begins to become saturated at a Pw of 8 mW, so that this disk is a highly sensitive recording material. The write power Pw corresponding to the highest C/N value, and the erase ratio after erasure by the DC light beam are given in Table 1.

Figure 4:
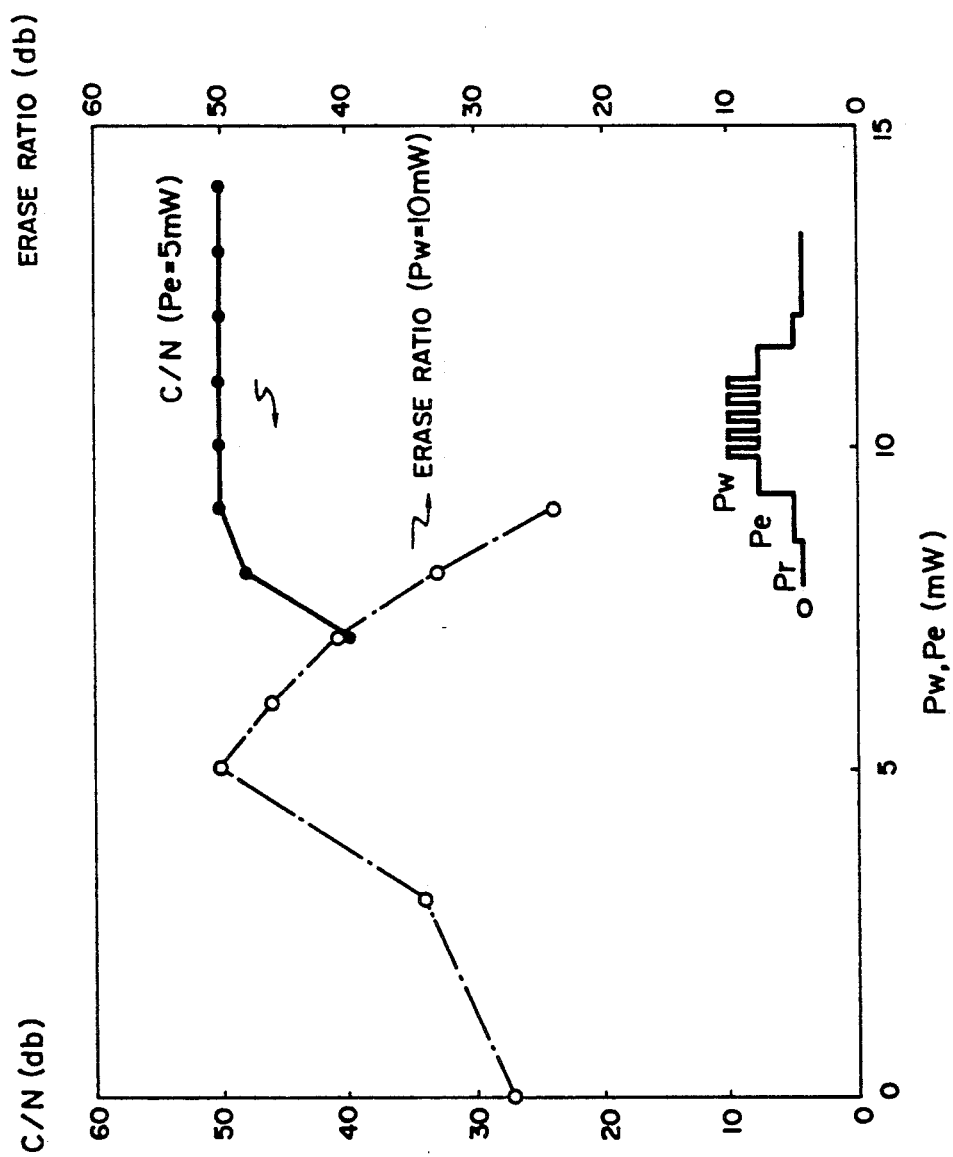
FIG. 4 is a graph showing the write/erase characteristics of the information recording medium of the present invention, during overwriting.

FIG. 4 shows the write/erase characteristics during overwriting. The black dots show the dependency of the C/N peak power Pw at a bias power Pe of 5 mW. At a Pw of 8 mW or greater the C/N starts to become saturated, and at a Pw≧9 mW the maximum C/N of C/N≧50 dB is obtained. The white dots show the dependency of the Pe of the erase ratio during a PW of 10 mW. A high value of −40 dB or greater is obtained for the erase ratio when the Pe≧4 mW. In particular, complete erasure is attained at a Pe=5 mW.

Experiments were performed on repeat performance and storage life in relation to reliability. When repeated experiments were run in overwrite mode, both C/N and erase ratio showed no deterioration, even after $10^6$ or more repetitions, and high performance was confirmed. Also, when heat resistance tests were performed at 70° C. 80° C., and 90° C., no change was observed in the C/N and erase ratios after 1500 hours.

EXAMPLE 2

A disk No. 2 according to the present invention was fabricated by repeating the procedure for Example 1 except that the $Ag_{11}In_{11}Te_{23}Sb_{55}$ employed as the recording material in Example 1 was replaced by $Ag_{10}In_{14}Te_{25}Sb_{51}$. Thus the structures of the other layers on this disk were the same as those of disk No. 1. Under the same conditions as Example 1, the maximum C/N ratio during simple write/erase mode and the erase ratio after erasure by a DC beam, and the corresponding write power Pw are given in Table 1. Complete erasure was provided at a C/N of 50 dB or greater in this disk also.

EXAMPLE 3

A disk No. 3 according to the present invention was fabricated by repeating the procedure for Example 1 except that the $Ag_{11}In_{11}Te_{23}Sb_{55}$ employed as the recording material in Example 1 was replaced by $Ag_8In_{10}Te_{21}Sb_{61}$. Thus the structures of the other layers on this disk were the same as those of disk No. 1. Under the same conditions as Example 1, the maximum C/N ratio during simple write/erase mode and the erase ratio after erasure by a DC beam, and the corresponding write power Pw are given in Table 1. Complete erasure was provided at a C/N of 50 dB or greater in this disk also.

COMPARATIVE EXAMPLE 1

In order to provide a comparative example, a disk was fabricated using $AgSbTe_2$ as a single phase recording material. The structures of the other layers on this disk were the same as those of the Examples. FIG. 5 shows the relationship for the C/N ratio during simple write/erase mode and the erase ratio after erasure by a DC light beam, versus the write power Pw, under the same conditions as in Example 1. However, the initialization power and the erasing laser power Pe were both 9 mW.

The white squares in the graph indicate the C/N values during writing, while the lengths of the arrows represent the C/N values after erasure by a DC light beam. From these results it is seen that with the $AgSbTe_2$ single phase, complete erasure, as obtained in the present invention, was not realized, and the C/N values were low. The maximum C/N values and the corresponding laser power Pw, and the erase ratios after erasure by a DC light beam are given in Table 1.

COMPARATIVE EXAMPLES 2-1 TO 2-5

Disks were fabricated using various compositions of Ag-In-Te-Sb as the recording material, as given in Table 1. The maximum C/N values during simple write/erase mode and the corresponding laser power Pw, and the erase ratios after erasure by a DC beam are also given in the Table. The measurement conditions were the same as for Example 1.

As shown in the Table, in the composition range of the present invention the C/N values were 50 dB or greater, and the desirable characteristic of complete erasure was demonstrated. Also, the write power is seen to be 12 mW or less, indicating a material of extremely high sensitivity.

On the other hand, the Comparative Examples, for which the compositions fell outside of the range of the present invention, exhibited low C/N values of 45 dB or less and low erase ratios were obtained in all cases. With one exception the required write power was high, indicating a lower writing and erasure sensitivity. In all cases, the writing/erasure repeatability characteristics and life expectancies were inferior to those of the information recording medium of the present invention.

TABLE 1

| Disk | Composition | C/N (dB) | Erase Ratio (dB) | Pw (mW) | Evaluation |
|---|---|---|---|---|---|
| Comp. Ex. 2-1 | $Ag_{24}In_{25}Te_{41}Sb_{10}$ | 32 | −5 | 15 | x |
| Comp. Ex. 2-2 | $Ag_{18}In_{19}Te_{36}Sb_{27}$ | 40 | −10 | 16 | Δ |
| Comp. Ex. 2-3 | $Ag_{15}In_{16}Te_{32}Sb_{37}$ | 45 | −25 | 16 | Δ |
| Ex. 2 | $Ag_{10}In_{14}Te_{25}Sb_{51}$ | 53 | −53 | 12 | ○ |
| Ex. 1 | $Ag_{11}In_{11}Te_{23}Sb_{55}$ | 56 | −56 | 11 | ○ |
| Ex. 3 | $Ag_8In_{10}Te_{21}Sb_{61}$ | 54 | −54 | 10 | ○ |
| Comp. Ex. 2-4 | $Ag_7In_7Te_{14}Sb_{72}$ | 37 | −37 | 13 | Δ |
| Comp. Ex. 2-5 | $Ag_4In_5Te_{11}Sb_{80}$ | 32 | −15 | 14 | Δ |
| Comp. Ex. 1 | $Ag_{25}In_0Te_{50}Sb_{25}$ | 42 | −23 | 10 | x |

Note)
○: good; x: bad; Δ: between ○ and x.

The present invention therefore provides an information recording medium with a long life expectancy, an improved C/N ratio, erase ratio, and writing and erasure sensitivities, on which repeated writings and erasures are possible.

What is claimed is:

1. An information recording medium for writing information through the transition of two phases of a recording material, utilizing electromagnetic wave energy and comprising a recording layer which in turn comprises a recording material consisting of a composition represented by the formula:

$Ag_\alpha In_\beta Te_\gamma Sb_\delta$ wherein
$6 \leq \alpha \leq 13$
$8 \leq \beta \leq 17$
$18 \leq \gamma \leq 28$
$45 \leq \delta \leq 66$
$\alpha + \beta + \gamma + \delta = 100$ 2. The information recording medium as claimed in claim 1, wherein 50 mol % or less of said recording material in said recording layer is in a crystalline state and the remaining 50 mol % or more thereof is in an amorphous state.

3. The information recording medium as claimed in claim 2, wherein said crystalline state consists essentially of $AgSbTe_2$.

* * * * *